US008461962B2

(12) United States Patent
Philippe

(10) Patent No.: US 8,461,962 B2
(45) Date of Patent: Jun. 11, 2013

(54) SYSTEM AND METHOD FOR SYSTEMATIZING PROVISIONING OF TWO BINS REPLENISHMENT SYSTEMS

(75) Inventor: Richard Philippe, Laval (CA)

(73) Assignee: Logi D Inc., Laval, Quebec (CA)

( * ) Notice: Subject to any disclaimer, the term of this patent is extended or adjusted under 35 U.S.C. 154(b) by 931 days.

(21) Appl. No.: 12/327,401

(22) Filed: Dec. 3, 2008

(65) Prior Publication Data

US 2010/0134251 A1 Jun. 3, 2010

(51) Int. Cl.
| | |
|---|---|
| G05B 19/00 | (2006.01) |
| G08B 13/14 | (2006.01) |
| G06G 1/14 | (2006.01) |
| G06Q 10/00 | (2012.01) |
| G06F 7/00 | (2006.01) |
| G06F 17/00 | (2006.01) |
| G06F 19/00 | (2011.01) |

(52) U.S. Cl.
USPC ........... 340/5.92; 340/572.1; 705/22; 705/28; 700/226; 700/236; 235/385

(58) Field of Classification Search
USPC ........................................ 340/5.92
See application file for complete search history.

(56) References Cited

U.S. PATENT DOCUMENTS

| | | | |
|---|---|---|---|
| 5,963,134 A | 10/1999 | Bowers et al. | |
| 6,240,764 B1 | 6/2001 | Geurts | |
| 6,335,685 B1 | 1/2002 | Schrott et al. | |
| 6,366,206 B1 | 4/2002 | Ishikawa et al. | |
| 6,550,674 B1 | 4/2003 | Neumark | |
| 6,891,473 B2 | 5/2005 | Maloney | |
| 6,935,560 B2 | 8/2005 | Andreasson et al. | |
| 6,988,080 B2 | 1/2006 | Zach et al. | |
| 6,998,541 B2 | 2/2006 | Morris et al. | |
| 7,032,820 B2 | 4/2006 | Kreiner et al. | |
| 7,080,777 B2 | 7/2006 | Wagner et al. | |
| 7,116,223 B2 | 10/2006 | Stern et al. | |
| 7,119,689 B2 | 10/2006 | Mallett et al. | |
| 7,123,150 B2 | 10/2006 | Mallett et al. | |
| 7,126,480 B2 | 10/2006 | Mallett et al. | |
| 7,138,918 B2 | 11/2006 | Mallett et al. | |
| 7,165,721 B2 | 1/2007 | Wagner et al. | |
| 7,183,920 B2 | 2/2007 | Napolitano | |
| 7,481,368 B2 * | 1/2009 | Wang et al. | 235/385 |
| 7,504,949 B1 * | 3/2009 | Rouaix et al. | 340/572.1 |
| 7,940,181 B2 * | 5/2011 | Ramachandra | 340/572.1 |
| 2001/0051905 A1 | 12/2001 | Lucas | |
| 2002/0188259 A1 | 12/2002 | Hickle et al. | |
| 2002/0198795 A1 | 12/2002 | Dorenbosch | |

(Continued)

FOREIGN PATENT DOCUMENTS

WO 2006136350 12/2006

*Primary Examiner* — Jennifer Mehmood
*Assistant Examiner* — John Mortell
(74) *Attorney, Agent, or Firm* — Bereskin & Parr LLP

(57) ABSTRACT

The present invention relates to a system and method for systematizing provisioning of two bins replenishment systems. The system comprises a database and a reader. The database stores location information and product identification for each product, the location information including rack identification, row information, and bin information. The reader receives an input from a user corresponding to a product to be provisioned, extracts from the database location information by correlating the input with the product identification, and outputs the location information to the user. The method comprises inputting a product identification corresponding to a product to be provisioned, extracting from a database location information corresponding to the product identification, and outputting the extracted location.

18 Claims, 6 Drawing Sheets

U.S. PATENT DOCUMENTS

| | | |
|---|---|---|
| 2004/0099736 A1* | 5/2004 | Neumark ............... 235/385 |
| 2004/0193316 A1 | 9/2004 | Lunak et al. |
| 2004/0199401 A1 | 10/2004 | Wagner et al. |
| 2004/0199545 A1 | 10/2004 | Wagner et al. |
| 2005/0075945 A1 | 4/2005 | Hodge et al. |
| 2005/0108114 A1* | 5/2005 | Kaled ..................... 705/28 |
| 2005/0149400 A1* | 7/2005 | Watkins .................. 705/14 |
| 2005/0197929 A1 | 9/2005 | Lucas |
| 2006/0087436 A1 | 4/2006 | Reddy et al. |
| 2006/0259377 A1 | 11/2006 | Fedor et al. |
| 2007/0115128 A1 | 5/2007 | Napolitano |
| 2008/0055088 A1* | 3/2008 | Fabre et al. ............ 340/572.1 |
| 2008/0319575 A1* | 12/2008 | Vahlberg et al. ......... 700/232 |

\* cited by examiner

SYSTEM AND METHOD FOR SYSTEMATIZING PROVISIONING OF TWO BINS REPLENISHMENT SYSTEMS

FIELD OF THE INVENTION

The present invention relates to provisioning of products, and more particularly to systematizing provisioning of supplies using technology in conjunction with two bins replenishment systems.

BACKGROUND OF THE INVENTION

Hospital centers are organized in multiple departments. Several departments rely on the principle of two bins, as shown on FIG. 1, for storing products. This particular replenishment system provides storage for a same product in two bins: a primary bin and a secondary bin. The primary and secondary bins are provided with a distinct identification tag. Products stored in the primary bin are used first, and when the primary bin is empty, the corresponding identification tag is removed from the primary bin and affixed to a provisioning board located nearby.

Presence of the identification tag of the primary bin on the provisioning board indicates that the primary bin is empty and must be provisioned. Until the primary bin is provisioned, products stored in the secondary bin are used. When the secondary bin becomes empty prior to provisioning of its corresponding primary bin, both corresponding identification tags are affixed to the provisioning board.

As various products are needed in hospital departments, racks are provided. Each rack typically stores multiple supplies, and two bins are used for each product.

Canadian Patent Application 2,565,934 describes such a replenishment system, in which the identification tags are Radio Frequency Identification (RFID) tags, and a provisioning board is adapted to read the RFID tags so as to automatically generate a provisioning request. This solution alleviates the hinder of provisioning by automating the generation of provisioning requests.

Upon receipt of the new provisions, the products are stored in the primary and secondary bins, and the corresponding RFID tags are put back on the respective bins. To ensure proper automatic generation of provisioning requests, it is necessary that the RFID tags be put back on the rightful bin. The use of RFID tags in this type of replenishment system has greatly improved provisioning turn around time and stock management.

It would be useful to have a system and method for systematizing provisioning of supplies to the two bins replenishment system.

SUMMARY OF THE INVENTION

The present invention provides systems and a method for improving the current two bins replenishment system.

In a first aspect, the present invention relates to a system for systematizing provisioning of products in two bins replenishment systems. The system comprises a database and a reader. The database is adapted for storing location information and product identification for each product, the location information including rack identification, row information, and bin information. The reader is adapted for receiving an input from a user corresponding to a product to be provisioned, for extracting from the database location information by correlating the input with the product identification, and for outputting the location information to the user.

In another aspect, the present invention relates to a system for replenishing products. The system comprises a pair of bins assigned to each product, the bins being adapted to receive a corresponding removable Radio Frequency Identification (RFID) tag. The system further comprises a provisioning board adapted to receive the RFID tags of empty bins, generating therefore provisioning requests and for transmitting the provisioning requests to a central unit. The system further comprises a database for storing location information and product identification for each product, the location information including rack identification, row information, and bin information. Additionally, the system comprises a reader for receiving an input from a user corresponding to a product to be provisioned, for extracting from the database location information by correlating the input with the product identification, and for outputting the location information to the user.

In according with yet another aspect, the present invention relates to a method for systematizing provisioning of two bins replenishment system. The method comprises inputting a product identification corresponding to a product to be provisioned, extracting from a database location information corresponding to the product identification, and outputting the extracted location.

BRIEF DESCRIPTION OF THE DRAWINGS

In the following description, the following drawings are used to describe and exemplify the present invention.

DETAILED DESCRIPTION OF THE INVENTION

Figure 1:
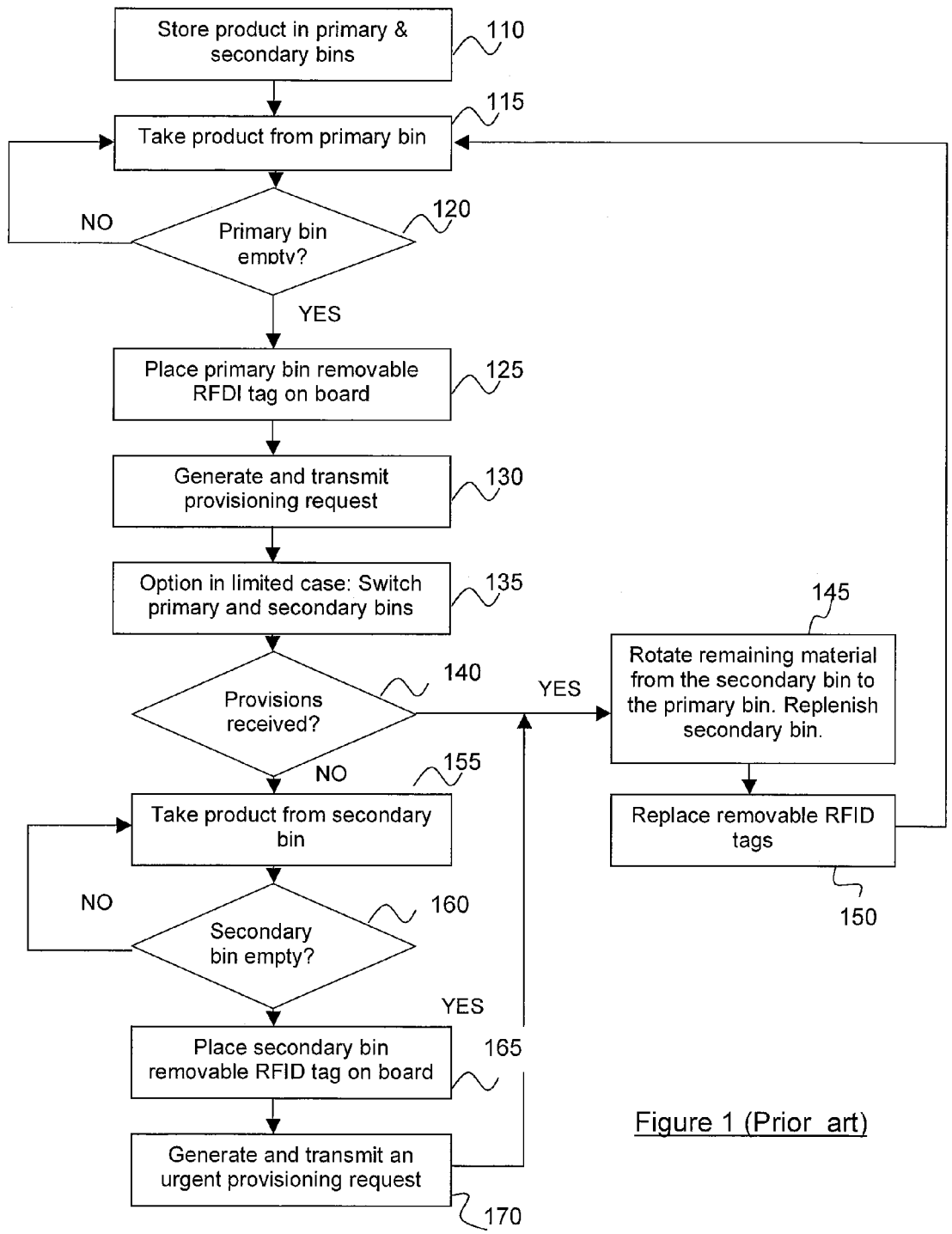
FIG. 1 is a flow chart of a prior art method for provisioning products of a two bins replenishment system with removable RFID tags.

The present invention relates to a method and systems for improving provisioning of two bins replenishment systems. More particularly, the present invention aims at improving the two bins replenishment system by systematizing provisioning of products and RFID tags handling reliability, so as to allow non-specialized employees to provision several departments of a hospital, without having inherent knowledge of products nor the stock room to be provisioned.

Hospitals are divided in multiple departments, each of which relates to a particular specialization. Each department uses general and specific products, stored in multiple areas of the department. Storage is performed using storage equipment that allows the organization of products in two bins, as schematically shown on FIG. 2. Typically in such a system 200, a rack (not shown for clarity purposes), is used to organize storage bins. For each product (products 1-6), a pair of two bins, namely a primary bin 210 and a secondary bin 220 is assigned. The product is thus stored at each location in both the primary 210 and secondary 220 bins. To each primary 210 and secondary 220 bins are associated corresponding removable Radio Frequency Identification (RFID) tags 230. As each primary 210 and secondary 220 bins store a particular product, each RFID tags is thus unique, and corresponds to a particular product, in a specific bin (primary or secondary), located at a particular location/department in the hospital. When one of the bins becomes empty, the corresponding RFID tag is removed from the bin, as shown for products 2 and 6, and apposed to a provisioning board 240. The provisioning board 240 includes an RFID reader to read the RFID tags, and generate provisioning requests 250 therefore to a central unit. The provisioning request 250 may be sent by various ways, such as wirelessly, intranet, Internet, etc.

Figure 2:
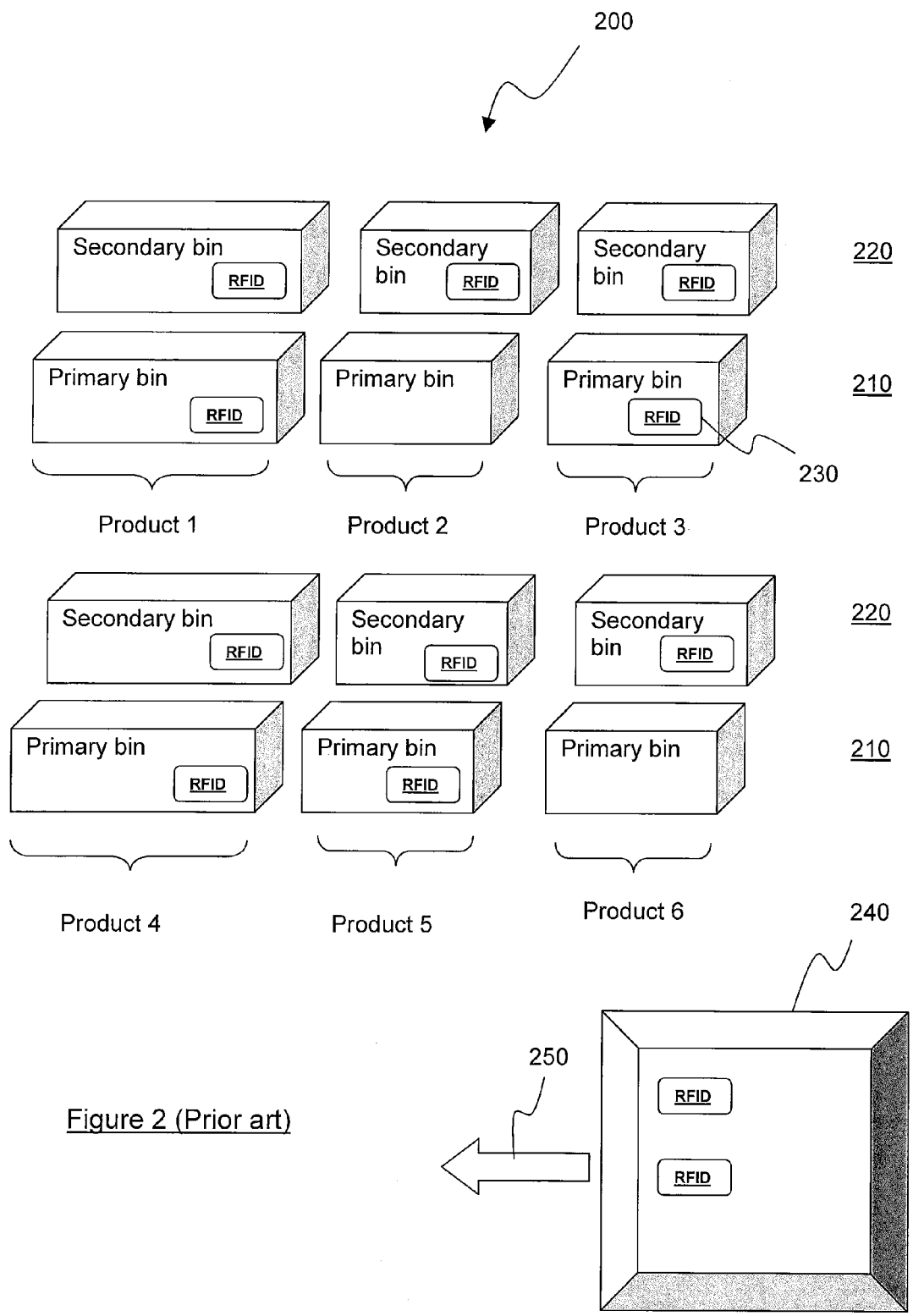
FIG. 2 is a schematic representation of a prior art two bins replenishment system.

Reference is now concurrently made to FIG. 1, which represents a flowchart of a method for provisioning products in the two bins replenishment system such as shown on FIG. 2. The method starts with storing the product 110 in the corresponding primary 210 and secondary bin 220. Then, in the course of daily activities, the employees of the department take 115, when needed, the product from the primary bin. The employees continue taking the product from the primary bin, until the latter is empty 120. When the primary bin is empty, the employee that takes the last item from the primary bin 210 places 125 the corresponding RFID tag 230 on the provisioning board 240. The provisioning board 240 automatically generates and transmits 130 a provisioning request 250 for that product. Optionally, it is also possible to switch 135 the primary bin 210 and secondary bin 220 so as to facilitate access to the products in the secondary bin 220.

If provisions are received 140, the method continues with rotating remaining products from the secondary bin to the primary bin, and replenishing 145 the secondary 220 bin (and optionally the primary bin 210). Upon completing the rotation and replenishing of the primary 210 and secondary bins 220, the corresponding RFID tag 230 is removed from the provisioning board 240 and replaced 150 on the corresponding bin. In the event that both the primary bin 210 and secondary bin 220 of a particular product were both empty and had to be replenished, both corresponding RFID tags are removed from the provisioning board 240 and replaced on their respective bin.

In the event that provisions are not received for the empty primary bin 210, when that corresponding product is required, the product is then taken 155 from the secondary bin 220, until the secondary bin 220 becomes also empty 160. When the secondary bin 220 also becomes empty, its removable RFID tag is placed 165 on the provisioning board 240, and an urgent provisioning request 250 is generated and sent 170.

Figure 3:
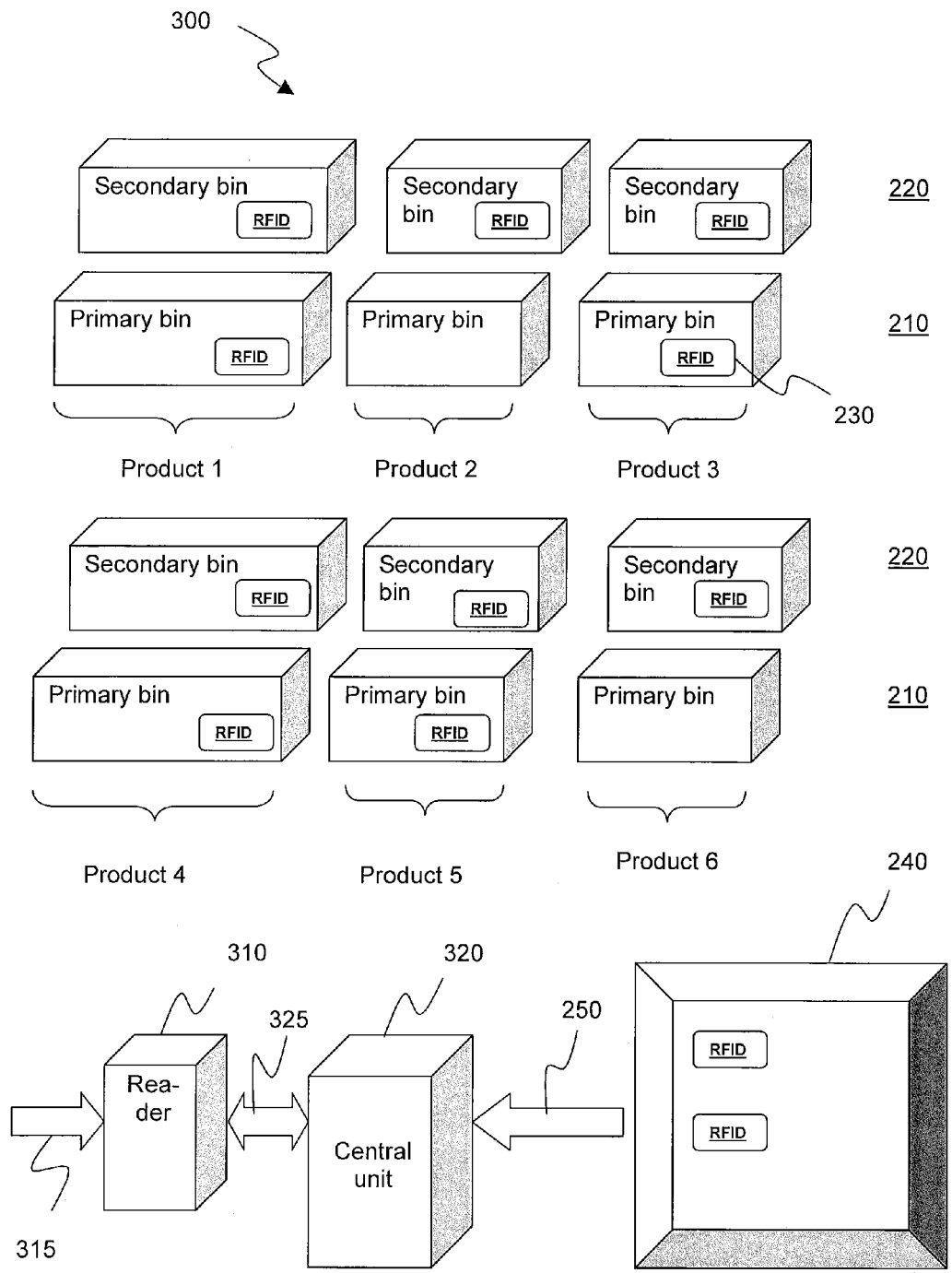
FIG. 3 is a schematic representation of a two bins replenishment system in accordance with an aspect of the present invention.

Reference is now made to FIG. 3, which is a schematic representation of a system for systematizing provisioning of two bins replenishment system in accordance with an aspect of the present invention. The two bins replenishment system is composed of pairs of bins 210 and 220 each pair being assigned to a product. Each of the bins is associated with a removable RFID tag 230. Each RFID tag 230 corresponds to a particular bin (primary or secondary), for storing a predefined product having a predefined Common User Product (CUP) code or a Device Identification Number (DIN), at a particular location.

The system also comprises the provisioning board 240 adapted to receive the RFID tags 230 of empty bins, for generating therefore provisioning requests and for transmitting the provisioning requests 250 to a central unit. The RFID tags 230 may be affixed to the provisioning board in various ways: deposited on receiving shelves, inserted in precut slots, inserted in specifically designed receiving pouches, using Velcro™, grip, etc. The provisioning board 240 may take various shapes, sizes and appearances, but preferably has a frame shape, with an exterior flat surface, behind which electric and electronic components are hidden.

Figure 4:
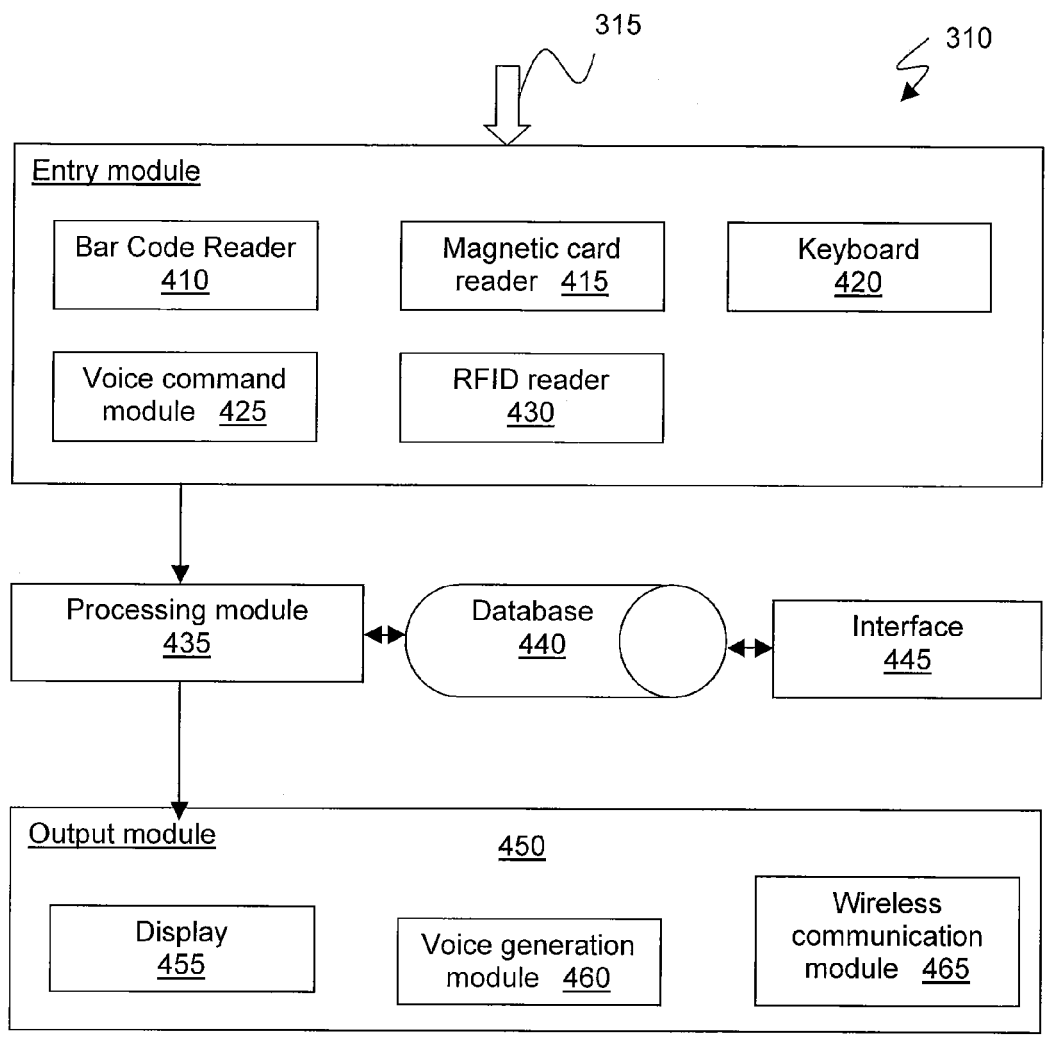
FIG. 4 is a block diagram of a reader for systematizing provisioning of a two bins replenishment system in accordance with an aspect of the present invention.

The system of the present invention further comprises a reader 310, concurrently shown as a block diagram in FIG. 4. The reader 310 may be a wired or a wireless reader. The reader 310 receives an input 315 corresponding to a product to be provisioned. The input may consist of any of the following: reading a bar code, reading of a magnetic card, a keyboard entry, a voice command, a RFID reading, or any other type of electronic input that represents the product to be provisioned. Hence, the reader 310 may comprise one or several of the following input modules, depending on the type of input 315 used: a bar code reader 410, a magnetic card reader 415, a keyboard 420, a voice command module 425 and/or an RFID reader 430.

The input received 315 by one of the entry modules is forwarded to the processing module 435. The processing module 435 analyzes the received input and accesses a database 440 to confirm that the input received corresponds to the product being provisioned, and to guide the user of the reader on the two bins where the product is to be provisioned. The database 440 may consist of a local database (on local memory), or a database accessible wirelessly. In the event that the database 440 is stored directly within the reader 310, it is foreseen that it could be updated through an interface 445, in a manner as known to those skilled in the art of database update within an electronic device. Alternatively, the database 440 could be provided on a removable memory stick. In such a case, the reader 310 would further include a memory stick reader (not shown). It is to be understood that should the database consist of a centralized database wirelessly accessible by the reader 310, the database 440 and interface 445 would then correspond to the wireless access to the centralized database and received information.

The database 440 may consist of a spreadsheet, a relational database, or any other type of information storage for storing information assisting in the provisioning of products. The database 440 can include one or several of the following information: the Common User Product (CUP) number or the Device Identification Number (DIN) of the product or the description of the product, data on the corresponding RFID tag 230, an electronic signal corresponding to the voice input of the CUP or DIN, location information (department, room number, rack identification, row number, etc.

Based on the input 315 received, the processing module 435 extracts information on the location to provision the product from the database 440, and provides guidance to the user for proper storage of the product in the appropriate bin through the output module 450. The output module 450 may include one or several of the following output modules: a display 455 such as a screen, a voice generation module 460 to provide vocal directions, a confirmation module 465 adapted to provide vocal and/or visual guidance for guiding the user.

In another embodiment, the output module 450 may concurrently or alternately provide a description of the product to provision, and the user may confirm identification of the product to provision through the entry module, so as to perform provisioning of product in an assisted mode.

In an aspect of the present invention, the wireless reader 310 guides the user in the storage of the product by providing instructions on the display 455. Typical instructions could include: an identification of the rack into which the product is to be stored, information of which row within the rack the product is to be provisioned, information of which bin within the row the product is to be provisioned, etc.

In another aspect of the present invention, the wireless reader 310 guides the user in the storage of the product by providing only voice-generated information through the voice generation module 460. In this particular embodiment, it could be advantageous to provide an output for earphones, or a wireless output for a headset such as for example a Bluetooth headset.

Although not specifically depicted on FIG. 4 for clarity reasons, it is clear to those skilled in the art that the reader 310 further include a power unit, which preferably consists of batteries or portable power unit. The reader 310 could further include an electrical input for allowing recharging of the power unit when not in use.

Thus, a user who provisions the storage equipment 300 uses the reader 310, which is preferably a small unit, in the shape of a handheld unit, or having a portion thereof that can be carried by or attached to the user for convenience purposes. Depending on the type of input available, the user can either read the CUP or DIN number on the product or packaging thereof, and identify the at least one corresponding bin by wirelessly reading the electronically recognizable identification tags.

In another embodiment of the reader 310, the database 440 may contain very limited or no information on the location where the product being provisioned is to be stored. In such an embodiment, the output module 450 further comprises a wireless communication module 465 to communicate 325 with the central unit 320 and extract there from information on the location (department, room, rack, row, bin) where the product should be provisioned.

In addition to systematizing provisioning of products in the two bins replenishment system, the reader 310 is further adapted to assist in the replacement of the removable RFID tag 230 on the corresponding bin. For doing so, various different embodiments may be contemplated. In a first embodiment, the database 440 may include information on the corresponding RFID rag 230, and upon completion of the provisioning of the proper bin, may further instruct to browse the provisioning board 240 so as to locate the corresponding RFID tag 230 and thereby assist the user in replacing the proper RFID tag 230 on the bin provisioned.

Figure 5:
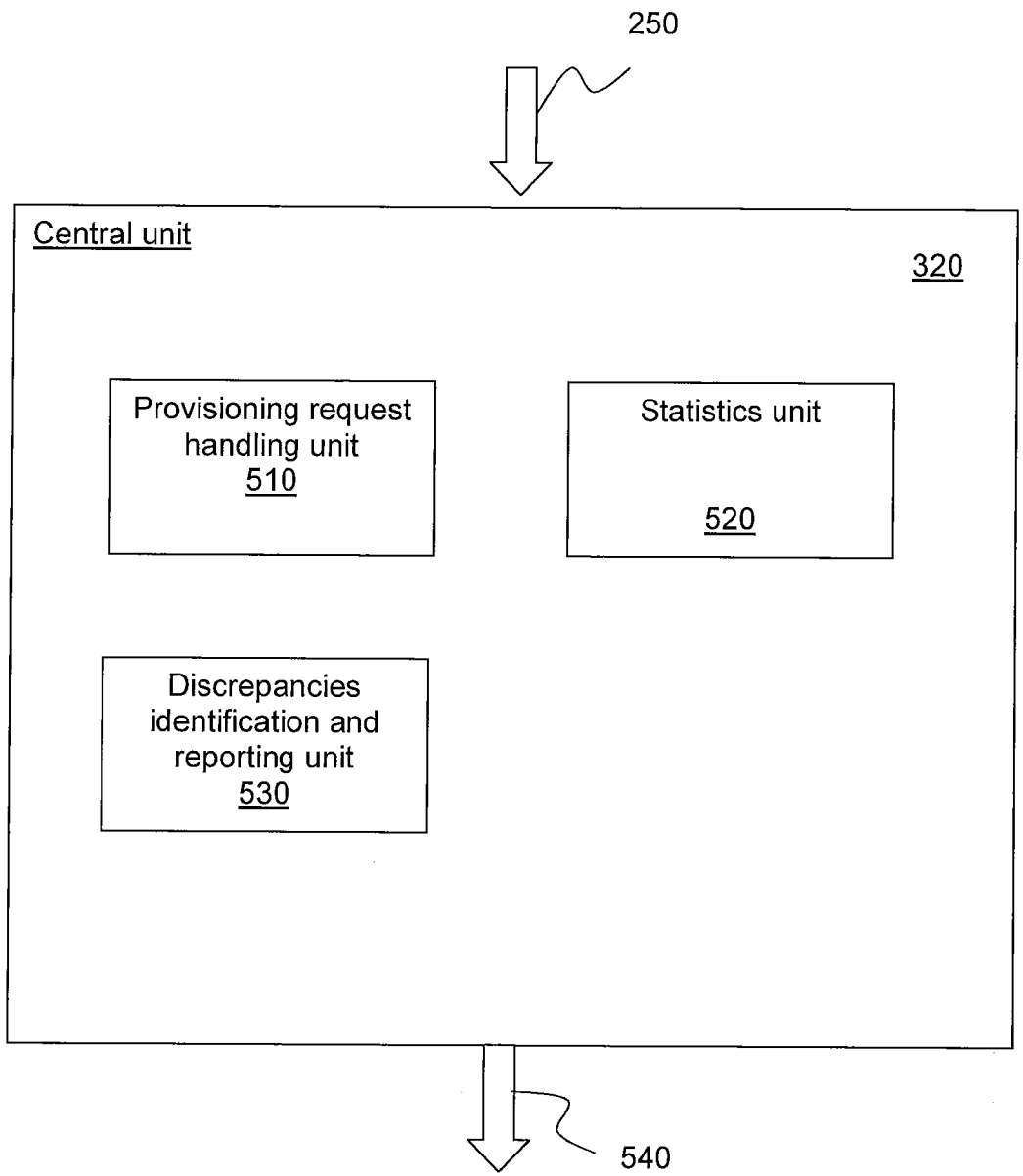
FIG. 5 is a block diagram of a central unit in accordance with an aspect of the present invention.

Reference is now made to FIG. 5, which depicts a block diagram of a central unit 500 in accordance with the present invention. The central unit receives the provisioning requests 250, and transfers information in order to generate orders and reports 540 there from. The central unit 500 comprises a provisioning request handling unit 510, a statistics unit 520, and algorithms in order to generate reports by the discrepancies identification and reporting unit 530. For clarity purposes, the following components have not been depicted: power unit, communication unit, interface, and input/output unit.

The central unit 500 receives the provisioning requests 250 from provisioning boards 240 located in various departments of the hospital, and the provisioning requests 250 are handled by the provisioning requests handling unit 510. The provisioning requests handling unit 510 compiles the requests, and transfers information in order to generate the provisioning. If the required products are in stock, the provisioning requests handling unit 510 transfers the information to a store or an appropriated department. If the required products are not in stock at a stock room of the hospital, the provisioning requests are transferred to a purchasing department.

The statistics unit 520 calculates for each product used in the hospital a consumption rate per bin, a consumption rate per department, a provisioning rate, and various quotas using the information collected each time a RFID tag 230 has been put on the provisioning board 240 and removed from the provisioning board 240. The statistics unit 520 calculates the various quotas as per the number of day each primary bin 210 and secondary bin 220 should carry. The statistics unit 520 also calculates the various quotas based on replenishment time using the time that a RFID tag 230 is put on a provisioning board 240 to the moment that the RFID tag 230 is placed back on the primary bin 210 or secondary bin 220.

The discrepancies identification unit 530 is adapted to identify, based on the received provisioning requests and calculated statistics, provisioning irregularities. Examples of provisioning irregularities that can be identified by the discrepancies identification unit 530 include: missing RFID tags, duplicate RFID tags, products no longer in use, etc.

Figure 6:
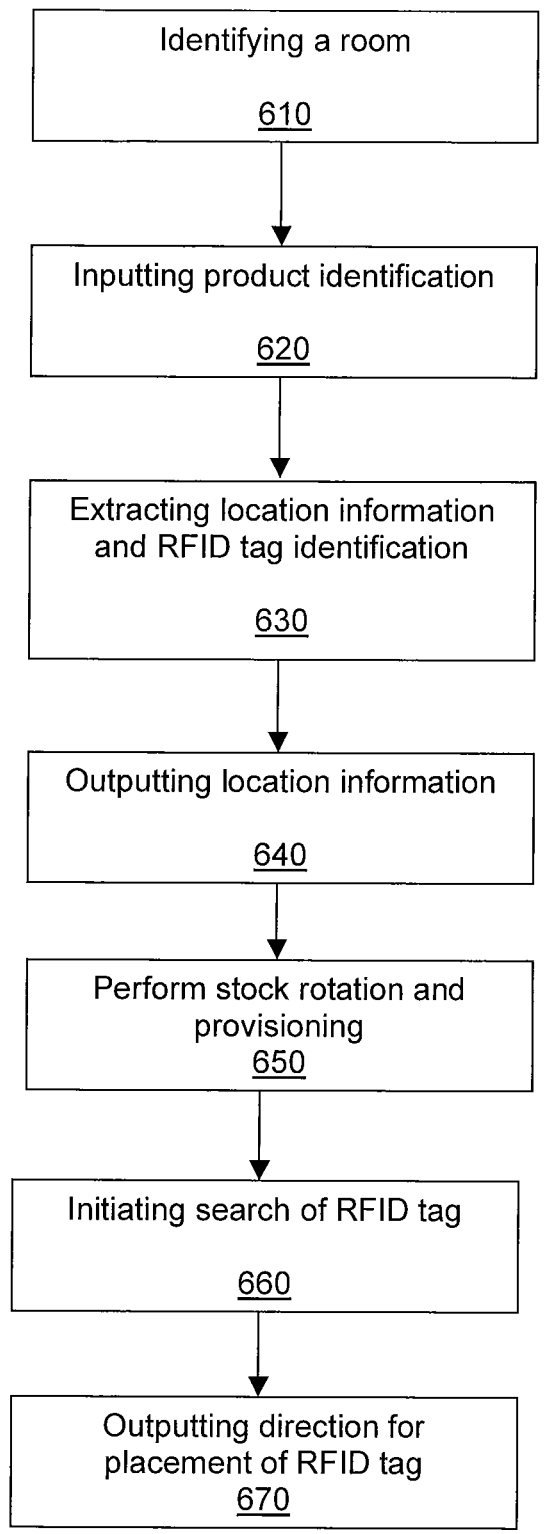
FIG. 6 is a flowchart of a method for systematizing provisioning of two bins replenishment system in accordance with an aspect of the present invention.

Reference is now made to FIG. 6, which is a flowchart of a method for systematizing provisioning of two bins replenishment systems in accordance with an aspect of the present invention. Typically when provisioning is performed in a hospital, several rooms are replenished sequentially by a user, and several products are provisioned in each room. The method of the present invention accounts for the difficulties inherent to provisioning of varied products in multiple rooms, using two bins replenishment systems.

The method starts by identifying 610 a room. Various methods can be used to identify the room. For example, the reader 310 could be used to enter manually a room number, or read a bar code corresponding to an identification of the room upon entry therein, or a RFID room identification could be used, or any other means which could allow electronic recognition of the room.

The method pursues with inputting 620 product identification. The product identification may consist, as previously described of the DIN, CUP, bar code, etc. The product identification is inputted using the reader 310. The product identification may be inputted using any of the following: the bar code reader 410, the magnetic card reader 415, the keyboard 420, the voice command module 425 or the RFID reader 430. The reader 310 then extracts 630 location information and RFID tag identification from the database 440 or the central unit 320, depending of the chosen implementation, as previously discussed.

The method then outputs 640 location information to the user corresponding to the inputted product identification. The location information may include rack identification, row identification, bin identification. The location information may be outputted in various ways: on the display 455 or by generating voice indications by the voice generation module 460. The user locates the bin or bins to be provisioned based on the outputted location information. Then, the user rotates 650 remaining products in the two bins in such a manner that the remaining products are placed in a first one of the two bins. Then, the user provisions the second one of the two bins.

The method continues with initiating search 660 for the RFID tag corresponding to the provisioned product on the provisioning board 240. The search may be initiated by outputting an indication to the user of the RFID identification information, or alternately by indicating to the user to browse the reader 310 over the provisioning board 240 so as to allow the reader 310 to read the affixed RFID tags 230. Once the corresponding RFID tag 230 has been located, the method then outputs directions for the user to enable placement of the RFID tag 230 on the provisioned bin.

If more than one product is to be provisioned in the room, the method repeats steps 620-670 until all products to be provisioned in the room have been provisioned by the user.

The products to be provisioned may be all put in one container or a corresponding to the room. In another embodiment, a cart containing general products may be used, and lists of products to be provisioned provided to the user for provisioning. Various other ways of providing the products to be provisioned to the room could also be considered.

Although the present invention has been described by way of preferred embodiments, the system and method are not limited to the embodiments provided herein. The scope of protection of the system, and method should be interpreted in view of the appended claims.

The invention claimed is:

1. A system for systematizing provisioning of products in two bins replenishment systems, the system comprising:
 a database for storing location information and product identification for each product, the location information including rack identification, row information, and bin information; and
 a reader for receiving an input from a user corresponding to a product to be provisioned, for extracting from the database location information by correlating the input with the product identification, and for outputting the location information to the user.

2. The system of claim 1, wherein the input is voice, and the reader further comprises a voice recognition module.

3. The system of claim 1, wherein the product identification and input are a Device Identification Number (DIN).

4. The system of claim 1, wherein the product identification and input are a Common User Product (CUP) number.

5. The system of claim 1, wherein the reader is further adapted to be attached to a user.

6. A system for replenishing products, the system comprising:
 a pair of bins assigned to each product, the bins being adapted to receive a corresponding removable Radio Frequency Identification (RFID) tag;
 a provisioning board adapted to receive the RFID tags of empty bins, for generating therefore provisioning requests and for transmitting the provisioning requests to a central unit;
 a database for storing location information and product identification for each product, the location information including rack identification, row information, and bin information; and
 a reader for receiving an input from a user corresponding to a product to be provisioned, for extracting from the database location information by correlating the input with the product identification, and for outputting the location information to the user.

7. The system of claim 6, wherein the reader is adapted to be attached to a user.

8. The system of claim 6, wherein the reader is further adapted to read the RFID tags and the database further stores RFID tag identification for each bin.

9. The system of claim 6, wherein the input is at least one of the following: a voice command, a Device Identification Number (DIN), or a Common User Product (CUP) number.

10. The system of claim 6, further comprising an interface for updating the database.

11. The system of claim 6, further comprising:
 a central unit for receiving the provisioning requests, and for calculating for each product at least one of the following: a consumption rate per bin or per department, a provisioning rate, and quotas.

12. The system of claim 11, wherein the central unit is further adapted for identifying provisioning irregularities comprising: missing removable RFID tags, duplicate removable RFID tags, and products no longer in use.

13. A method for systematizing provisioning of a two bin replenishment system, the method comprising:
 inputting a product identification corresponding to a product to be provisioned, each product having a pair of bins assigned thereto, wherein each bin is adapted to receive a corresponding removable Radio Frequency Identification (RFID) tag;
 extracting from a database location information corresponding to the product identification; and
 outputting the extracted location.

14. The method of claim 13, further comprising a step of providing information of a room where the replenishment system is located, and wherein:
 the extracted location information is dependent of the room in which the replenishment system is located and comprises rack information, row information and bin information.

15. The method of claim 14, further comprising:
 rotating remaining product in the two bins replenishment system and provisioning the product to be provisioned in a second one of the two bin replenishment system.

16. The method of claim 15, further comprising:
 identifying using a reader an RFID tag corresponding to the product to be provisioned; and
 replacing the RFID tag on the two bin replenishment system.

17. The method of claim 16, wherein the identifying is further performed by extracting an RFID tag identification from the database.

18. The method of claim 13, wherein the product identification is at least one of the following:
 a Device Identification Number (DIN), Common User Product (CUP) number or a bar code.

* * * * *